United States Patent [19]

Lapp et al.

[11] 4,306,812

[45] Dec. 22, 1981

[54] DEVICE FOR MEASURING A TRANSVERSE DIMENSION OF A THREAD-LIKE STRUCTURE

[75] Inventors: Karl Lapp, Zurich; Hansruedi Stutz, Dietlikon, both of Switzerland

[73] Assignee: Gebrüder Loepfe AG, Zurich, Switzerland

[21] Appl. No.: 97,314

[22] Filed: Nov. 26, 1979

[30] Foreign Application Priority Data

Dec. 12, 1978 [CH] Switzerland ........................ 12635/78

[51] Int. Cl.³ ........................ G01B 11/10; G01B 11/02

[52] U.S. Cl. ........................................ 356/385; 356/429

[58] Field of Search ................ 356/372, 307, 384–387, 356/379, 434, 429–431; 250/560, 578, 571–572, 214 B, 214 C, 341, 559, 562–563; 358/113, 107, 106

[56] References Cited

U.S. PATENT DOCUMENTS

| | | | |
|---|---|---|---|
| 3,894,803 | 7/1975 | McLean et al. | 356/307 |
| 4,162,052 | 7/1979 | Lamelot | 250/214 C |
| 4,173,788 | 11/1979 | Laliotis | 356/387 |

*Primary Examiner*—William H. Punter

*Attorney, Agent, or Firm*—Werner W. Kleeman

[57] ABSTRACT

A device for measuring the instantaneous value of the diameter or other transverse dimension of a traveling yarn comprises a linear array of photoelectric sensors and an electronic measuring device for digitally processing the electric signals furnished by the sensors in parallel form. A ground signal is taken with no yarn present and stored in the measuring device, and a measuring signal is taken with yarn present. The measuring device comprises logic circuitry for subtracting the stored ground signal from the measuring signal such as to eliminate the ground signal and to furnish a pure yarn signal representative of the yarn diameter.

4 Claims, 2 Drawing Figures

STORAGE DEVICE–4
LOGIC CIRCUIT–6
SIGNAL UNIT
E1
1 ARRAY
LIMITER
GS–1
3–1
S
R
4–1
6–1
&
1–1
2–1
PHOTO-SENSOR
DS–1
5–1
MS–1
OUTPUT STAGE
7
8
9
10
11
12
13
M
U1
DS
SWITCH-ING DEV.
ADDER
HIGH PASS FILTER
RECTI-FIER
AMPLI-FIER
RELAY
ADDER
1–n
2–n
4–n
GS–n
6–n
DS–n
3–n
14
15
5–n
MS–n
AND GATE
En
SIGNAL UNIT
STORAGE UNIT
U2
RELAY

DEVICE FOR MEASURING A TRANSVERSE DIMENSION OF A THREAD-LIKE STRUCTURE

CROSS REFERENCE TO RELATED CASE

This application is related to the commonly assigned copending United States Application Ser. No. 101,879, filed Dec. 10, 1979.

BACKGROUND OF THE INVENTION

The present invention relates to a novel device for measuring a transverse dimension of a thread-like structure, and in particular of a yarn running on a textile machine. Such a measuring device is, among others, of importance for detecting and eliminating yarn faults with the aid of electronic yarn clearers.

Devices for recording various variable processes with the aid of linear or two dimensional arrays of optoelectrical sensors are known. In German Pat. No. 1,216,589 there is described an arrangement for mechanical detection of characters passing with a constant speed by a sensing zone, where the information content appearing in the sensing zone is supplied to a matrix memory. The characters are sensed by a double row of photosensors, where the sensors of one row are stäggered to the ones of the other row, in order to ensure uninterrupted sensing. The binary signals furnished by the sensors in any sensing cycle are processed in parallel. Any character is read in five consecutive sensing cycles in the direction of reading, and the binary signals gained in one cycle are stored in one of five storage rows. Each storage row comprises a multiplicity of storage units the number of which is greater than the number of sensors.

This manner of sensing has up to now not yet gained acceptance in the technology of measuring running yarns, threads, slivers etc. though it implies certain advantages in the textile industries.

Thus, with the conventional optoelectrical measuring devices which are used e.g. in optoelectronic yarn clearers, the continuous detection of the transverse dimension of the yarn causes serious difficulties since the measuring signals furnished by the sensor always comprise the ground signal brought about by the empty measuring area, combined with the relatively small yarn signal which represents the transverse dimension. Thus, any changes of the ground signal due to ageing of the structural parts and, in particular, to dirt or contamination of the optics also affect the yarn signal. Now it is difficult or even impossible to continuously compensate or eliminate those undesired changes during the working process and, in particular, when clearing yarn in the winding plant. Above all, unsymmetrical dirt distribution in the optics is a problem which up to now has not been dealt with, much less solved.

SUMMARY OF THE INVENTION

It is a primary object of the invention to provide a novel optoelectrical yarn measuring device based on digital yarn sensing.

It is a further object of the invention to procure a yarn measuring device which provides for elimination of the ground signal and the undesired changes thereof which affect the measurement of the yarn transverse dimension.

Another and more specific object of the invention is the suppression of the influence of unequal dirt distribution in the measuring area of an optoelectrical yarn measuring or sensing device.

In the following context, the term transverse dimension is meant to comprise the diameter, cross-sectional area or generally the variable measured by the sensing procedure.

With the normal working of a textile machine, in particular an automatic yarn winding machine, there occur, e.g. when the supply bobbin is changed or after yarn severing events which eliminate yarn faults, stoppages during which no yarn is present in the measuring area. The inventive measuring device advantageously makes use of those stoppage intervals for detecting and storing the ground signal caused by the empty measuring area and thus avoids interruption of the normal run of the winding process. Then, when the winding device has started again, the ground signal combined with the yarn signal is measured, and by subtracting the stored ground signal from the combined signal there results the pure yarn signal.

In the following description of the invention and claims, the parallel processing of digital signals furnished by an array of photosensors is illustrated. The term binary refers to the signals produced by a single sensor, the term digital refers to a signal representing the total of the binary signals.

BRIEF DESCRIPTION OF THE DRAWINGS

The invention will be better understood and objects other than those set forth above will be apparent upon consideration of the following detailed description thereof which makes reference to the annexed drawings wherein.

DETAILED DESCRIPTION OF THE INVENTION

Figure 1:
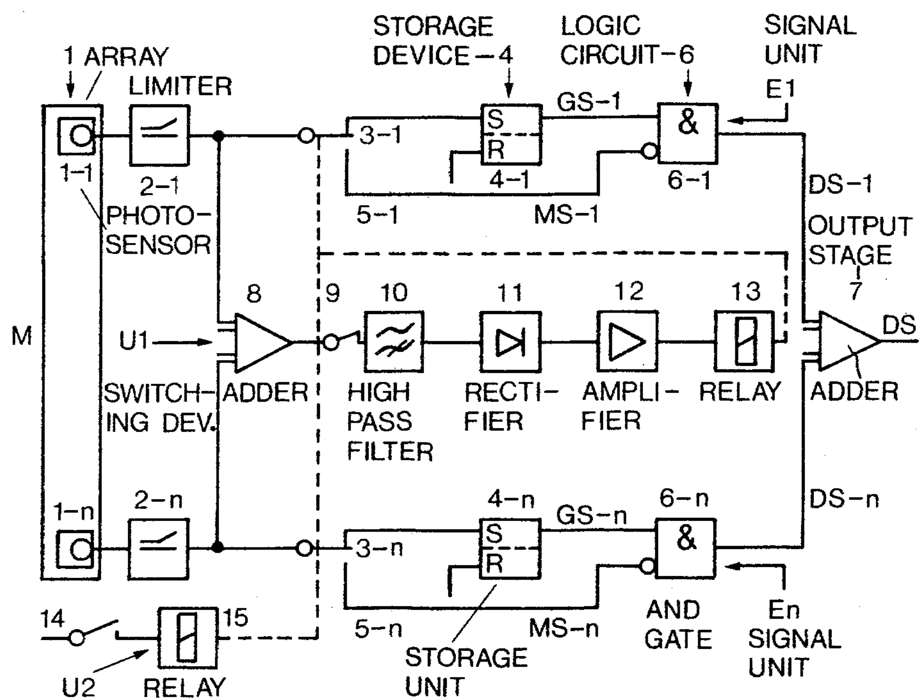
FIG. 1 shows an embodiment of the inventive measuring device in block schematic, including two alternative switching devices.

With reference to FIG. 1, an array 1 comprises n photosensors 1-1 through 1-n, a thereto connected measuring circuitry comprising n signal units E1-En and an output stage 7. The latter furnishes an analog output signal DS representing the instantaneous value of the transverse dimension or thickness of a traveling yarn. To the output of output stage 7 there may be connected an indication device, such as a recorder, or the evaluation circuit of an electronic yarn clearer which may be arranged in conventional manner. The light source lighting the yarn and photosensors is not shown, however, a beam of parallel light is preferred for the yarn sensing. Directly in front of, i.e. at the left side of array 1, there is the measuring area M which receives the yarn to be sensed.

Array 1 comprises n sensors, such as photodiodes 1-1 through 1-n, and is arranged in a direction transverse to the running yarn (not shown). Each of the n signal units E1-En is individually connected to one of the sensors 1-1 through 1-n. The output of each signal unit E1-En is connected to one of n inputs of output stage e.g. an adder 7 generating the analog thickness signal or differential signal DS.

Figure 2:
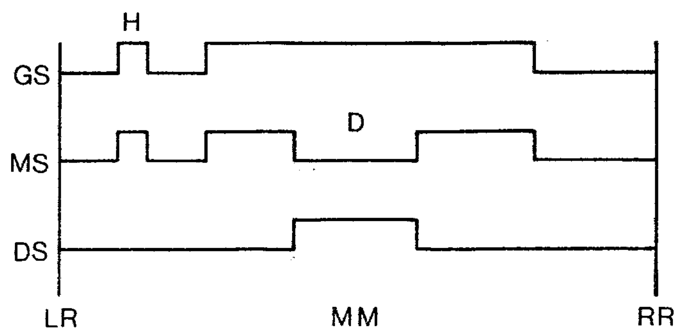
FIG. 2 is a pulse or signal graph illustrating the mode of operation of the device shown in FIG. 1.

Each signal unit E1-En comprises one of n switch contacts 3-1 through 3-n of a throw-over switching device U1. In the ground or closed position shown in FIG. 1 each of the switch contacts 3-1 through 3-n connects its associated sensor 1-1 through 1-n with a series circuit consisting of a storage unit 4-1 through 4-n and an AND-gate 6-1 through 6-n having a first input and a negated second input. With said ground position the ground signal GS, FIG. 2, is measured and stored. Now when parts of the contacts 3-1 through 3-n are switched over into their other or open position when yarn is running in sensing area M, a measuring signal MS is produced. Further on, a thickness signal DS, FIG. 2, is generated, by substracting MS from the ground signal. Storage units 4-1 through 4-n, each constituting a one bit storage unit, together form a storage device 4, and AND-gates 6-1 through 6-n a differential logic circuit 6.

In each of the signal units E1-En there is provided, as an input stage, a threshold circuit or limiter 2-1 through 2-n which passes only signals, constituting one bit sensing signals and surmounting a certain level. These limiters 2-1 through 2-n may be integrated with the sensors 1-1 through 1-n. Thus, the one bit sensing signals furnished by the sensors 1-1 through 1-n are divided in two sets, one set representing the condition "dark" and the other set the condition "bright". When measuring ground signal GS, these binary one bit binary signals are applied to the S-inputs of one bit storage units 4-1 through 4-n, such as RS-flipflops, and stored therein. The Q-output of each RS-flip-flop 4-1 through 4-n is connected to the first input of its associated AND-gate 6-1 through 6-n.

The stored binary signals GS-1 through GS-n, the total of which forms the digital ground signal, remain stored in storage device 4 even after switching over or opening the contacts 3-1 through 3-n. Upon such switching over, the sensors 1-1 through 1-n are connected, through the limiters 2-1 through 2-n and the measuring channels 5-1 through 5-n, to the negated second inputs of the AND-gates 6-1 through 6-n which then receive the binary measuring signals MS-1 through MS-n.

The switching device U1 substantially consists of a series connection of a second adder 8, a switch 9, a high-pass filter 10, a rectifier 11, an amplifier 12, and a relay 13 associated with the aforementioned switch contacts 3-1 through 3-n. The n inputs of a second adder 8 are connected to the outputs of the n limiters 2-1 through 2-n. As long as the measuring area M is empty or free of yarn, or the yarn in measuring area M does not travel, a constant D.C.-voltage is the input and output of the second adder 8, which D.C.-voltage is unable to pass high-pass filter 10. Thus, relay 13 is not energized, and the switch contacts 3-1 through 3-n occupy the ground position shown in FIG. 1.

However, when the machine, e.g. a winding unit, is starting with yarn in the measuring area M, the sensor signals are subject to statistical fluctuations corresponding to statistical deviations of the diameter of the traveling yarn. Now a summed up signal is generated at the output of the second adder 8 which signal comprises a D.C.-voltage and superposed A.C.-voltage component. As long as the yarn is traveling, the A.C.-voltage is filtered in high-pass filter 10, rectified in rectifier 11, amplified in amplifier 12 and energizes relay 13, and contacts 3-1 through 3-n are switched over and remain in the position connected to the measuring channels 5-1 through 5-n, i.e. the measuring position.

Now the operation of the measuring device shown in FIG. 1 will be described. There is assumed the very important practical case that the marginal parts of the measuring area M (in FIG. 1 near 1-1 and 1-n) at both sides of the yarn are partially covered with dirt which often occurs with yarn clearers even after short operation. The middle part of the measuring area M in which the yarn travels should be clear due to the cleaning or rubbing effect of the traveling yarn which may be achieved by a correct design and arrangement of the optical components of the measuring device.

With reference to FIG. 2 the signal formation will now be explained. This Figure shows the light or brightness distribution in digital representation in a direction transverse to the yarn path. The "Zero" line of each graph corresponds to the conditon "dark" and the "One" line to the condition "bright". The left border of the measuring area is marked by LR, the right border by RR, and the middle by MM.

In the first line at GS the light distribution with the empty measuring area M is represented; adjacent the left margin LR and the right margin RR there are dark areas due to dirt or dust. The dark area at the left edge LR is interrupted by a bright spot at H. Around the middle MM there is a bright area such as is caused—-even when the marginal areas are heavily shadowed with dirt—by the running thread which takes or sweeps away eventually appearing dust or dirt particles. The second line at MS shows the light distribution with yarn entered in the measuring area M. Here, in the middle MM of the measuring area M there is shown a broad darkening at D which is caused by the yarn. In the third line at DS there appears the difference of the signals GS and MS, represented by a positive signal indicative of the transverse dimension of the yarn.

FIG. 2 discloses that a pure yarn signal results from the differentiation or subtraction process, that means a yarn signal free from the ground signal in which the effect of unequal dirt distribution in the measuring area M is eliminated.

For the sake of clearness the present description presumes brightness values such as viewed by the single sensors 1-1 through 1-n of array 1. The total of those brightness values results in the light distributions in the measuring area M in a direction transversal to the yarn. Those light distributions are represented, for the ground signal GS and the difference signal or yarn signal DS by digital output signals of the shape shown in FIG. 2.

The signal formation described with reference to FIG. 2 may be carried out with the idle or stopped machine, since the switching device U1 automatically responds to the electrical step signal which appears when the yarn has entered into the measuring area M. However, a locking contact relay should be used in this case since there is no signal indicative of yarn travel.

FIG. 1 shows a further switching device U2 which may be alternatively used instead of switching device U1. The switching device U2 comprises a switch 14 and a relay 15 which operates on the switch contacts 3-1 through 3-n. The normally opened contact 14 may be manually closed simultaneously with the yarn inserted in the measuring area M or may be automatically closed by the winding machine such that the sensors 1-1 to 1-n are connected to the measuring channels 5-1 to 5-n as previously described.

With a continuously operating yarn winding machine provided with an electronic yarn clearer, the remaining switching operations necessary for the described measuring device, such as resetting the one bit storage units 4-1 to 4-n, may also be automatically controlled. In particular, the stoppages unavoidably occurring during operation when cops are arranged or upon yarn cuts effected by the yarn clearer, are used for measuring the ground signal such that the normal operation of the machine is not disturbed.

In FIG. 1, the switching devices U1 and U2 are provided with relays 13 and 15, respectively, comprising switch contacts 3-1 through 3-n. However, when the measuring device is structured with electronic components solely, electronic switches are provided in place of said relays.

In the measuring device of FIG. 1, a dual adder having n inputs and comprising n-1 digits may occupy the place of the first adder 7. Then, the n inputs are connected to the outputs of the AND-gates 6-1 through 6-n, such that the output or differrence signals DS are provided in digital form.

The throw-over switching devices U1 or U2 are not indispensable parts of the described measuring device provided the latter is modified according to that. Thus, D-bistable elements or D-flipflops having a D-input and a C-input may replace the RS-flipflops 4-1 through 4-n. With such a D-flipflop the binary value existing at the D-input in a certain instant is stored when in that instant the binary signal at the C-input is ONE. Thus, by a common ONE-pulse at the C-input all the D-flipflips may be set to the ground signal furnished by the limiters 2-1 to 2-n. In this manner it is possible to simultaneously and lastingly connect the output of any limiter 2-1 through 2-n with the D-input of its associated D-flipflop and the corresponding measuring channel 5-1 to 5-n. The binary ZERO and ONE signals remain stored as long as the D-flipflop is set by another C-pulse.

The novel measuring device may also be used for detecting and measuring the diameter of wires, cables, the width and thickness of tapes and other endless structures.

While there are shown and described present preferred embodiments of the invention, it is to be distinctly understood that the invention is not limited thereto but may be otherwise variously embodied and practiced within the scope of the following claims. Accordingly,

What we claim is:

1. A device for measuring a transverse dimension of a thread-like structure, comprising optoelectrical thread sensing means provided with a measuring area for receiving the thread-like structure to be sensed, and electronic measuring circuitry connected to the optoelectrical thread sensing means, wherein:

the optoelectrical thread sensing means comprises a linear array of a number of optoelectrical sensors for producing electrical sensing signals, the electronic measuring circuitry comprises:

a number of limiting means each of which is individually connected to one of said optoelectrical sensors for producing, from said sensing signals, one bit sensing signals indicative of the quantity of light impinging on each sensor and surmounting a certain level;

a number of one bit storage units each of which is individually connectable to one of the limiting means;

switching means for simultaneously connecting the one bit storage units with the corresponding limiting means when no thread-like structure is present in the measuring area; and further comprising a number of logic gate means each havingtwo inputs and an output, one of which inputs is individually connected to the output of one of the one bit storage units, and the other input of which is connectable to the corresponding limiting means for furnishing one bit output signals indicative of whether or not the amount of light impinging on the sensor surmounts said certain level.

2. The measuring device as defined in claim 1, additionally comprising an output stage connected to the output of the gate means for combining the one bit output signals thereof.

3. The measuring device as claimed in claim 1, wherein the one bit storage units are arranged for storing of the one bit sensing signals furnished by the sensors when no thread is present in the measuring area.

4. The measuring device as claimed in claim 2, wherein the output stage is arranged as an analog adding means furnishing an analog output signal indicative of the transverse dimension of the thread-like structure.

* * * * *